United States Patent [19]

Trischler et al.

[11] 3,975,743

[45] Aug. 17, 1976

[54] TIME REGISTRATION DEVICE FOR THE RECORDATION OF PRESENCE OR WORK TIME

[75] Inventors: Günther Trischler, Plochingen; Hartmut Reichert, Zell, both of Germany

[73] Assignee: Simplex Time Recorder Company, Gardner, Mass.

[22] Filed: July 7, 1975

[21] Appl. No.: 593,721

[30] Foreign Application Priority Data

July 16, 1974 Germany .......................... 2434074

[52] U.S. Cl. .................................... 346/91; 346/82

[51] Int. Cl.[2] ........................................ G01D 15/20

[58] Field of Search .................. 346/20, 80, 89, 91; 58/152 R

[56] References Cited

UNITED STATES PATENTS

| | | | |
|---|---|---|---|
| 1,098,484 | 6/1914 | Craig | 346/91 |
| 2,019,301 | 10/1935 | Friden | 346/91 X |
| 2,796,315 | 6/1957 | Moodie | 346/89 X |

*Primary Examiner*—George H. Miller, Jr.
*Attorney, Agent, or Firm*—Shenier & O'Connor

[57] ABSTRACT

An improved time-registration device for recording date and work times on lines of a registration card including a day-program wheel of at least 31 sectors, of which the 29th to 31st sectors contain cams of varying height, and a month-program wheel with at least 12 sectors, each of said sectors having a cam height corresponding to the number of days in each month, scanners for the day- and month-program wheels operating together mechanically at the end of each month to operate a switch to advance the wheels for the following month, the improvement comprising the month-program wheel being frictionally driven by the day-program wheel at the end of each month.

10 Claims, 6 Drawing Figures

TIME REGISTRATION DEVICE FOR THE RECORDATION OF PRESENCE OR WORK TIME

The invention concerns a time-registration device for the recordation of presence or work time onto lines of a registration card corresponding to each particular day, such recordation being performed by means of a time controlled printing device. The time-registration device further contains a card receptor or carriage forming a stop for the registration cards which are introduced into the machine in a direction perpendicular to its lines; said card receptor is in the direction perpendicular to the lines of the registration card, and by means of a drive mechanism advanceable daily by an amount of at least one line. The time-registration device further comprises a day-program wheel which is advanced daily by the drive mechanism, and contains at least 31 sectors, each corresponding to a day of a month, of which the 29th to 31st sector contain cams of varying height, and a monthly advancing month-program wheel with at least 12 sectors corresponding to the months of at least one year, each of said sectors having a cam which height corresponds to the number of days of the month assigned to this sector. The device further contains scanners for the day and the month-program wheel, the scanners together with a switch activated by the scanners forming a comparator for the additional activation of the drive mechanism in cases when a scanned day-program wheel cam exceeds a boundary value determined by the simultaneously scanned month-program wheel cam.

Such a time-registration device is already known (stamp clock of the firm Amano), in which the cams of the day- and month-program wheel extend in a radial direction. The circumference of the day-program wheel thereby forms a circular line from the first to the 28th sector, followed by cams of increasing height for the 29th to 31st sector. The cams of the month-program wheel are all the higher, the fewer the days within the corresponding month. A double armed lever scans with its one arm the day-program wheel, while the other arm contains a micro-switch. Between it and the month-program wheel there is arranged coaxially to the double armed lever a scanning lever for the month-program wheel. As soon as the double armed lever perceives the cam of the day-program wheel, the micro-switch is pivoted in the direction of the month-program wheel and is activated by means of the scanning lever of the latter, if such a scanning lever as a result of the height of the just scanned cam of the month-program wheel cannot be avoided. When the micro-switch is closed, the drive mechanism for the day-program wheel and the card carriage is activated until the double armed lever returns to the circumference of the first sector of the day-program wheel. It is thus achieved that the card carriage at the end of a month which contains less than 31 days nevertheless is returned to the position corresponding to the beginning of the next month. In this connection it should also be pointed to the following characteristics of the known device: One element of the card carriage is a saw-tooth bar which intermeshes with a gear driven by the drive mechanism, and thereby may be raised or lowered daily by the amount of one line space of the registration cards. For this purpose the drive mechanism receives daily, for example at midnight, an impulse from a time- or program-control device, which then leads to the line transport. The gear meshing with the saw-tooth bar further contains at least one toothless section at its circumference, so that the card carriage falls back or is returned to its initial position either at the midpoint of a month or at the end of a month depending upon the design of the registration card. In months of less than 31 days the drive mechanism at the end of the month is activated prematurely, and remains activated until the 31st advance step has been executed.

Since the day-program wheel is advanced each day by one sector while the month-program wheel is activated only once per month, the known time registration device contains two stepping drives, one for each of the coaxially arranged program wheels. Here this invention takes up; its object was to simplify a time registration device of the previously mentioned type; such was achieved according to the invention by driving the month-program wheel via a friction clutch with the day-program wheel, and by providing a blocking device for the month-program wheel, controllable through the most extreme, i.e. the highest cam of the day-program wheel. Thus, no special drive for the month-program wheel is required, and the blocking device may be a simple brake or locking mechanism, which, as will be shown below, is constructed so simply that thereby no real additional costs arise.

The inventive time-registration device may be embodied and varied in many ways. As already mentioned, it is immaterial principally whether the lines of a side of the registration card correspond to the days of a week, of a half month, or of an entire month, since this only influences how often the connection between the drive mechanism and the card receptor or carriage is interrupted, the latter thus to be returned. For the raising or lowering of the card receptor in lieu of gears and a saw-toothed bar, curve templates or same may be applied as well; furthermore, it is of course also possible to raise or lower the printing mechanism by an amount equal to a line and to insert the registration card always the same amount into the time registration device rather than moving the card carriage relative to the printing device. Also it is of course not obligatory to use a common drive mechanism for the movement of the card receptor and the advance of the program wheels; it would also be possible to synchronously actuate two separate drive mechanisms. Furthermore, the drive mechanism could drive directly only the card receptor, the latter then to drive the program-wheels. From the above it should also be clear that no cam per se must be provided for the sectors of the program-wheels, but that protrusions or depressions of a suitable kind would suffice; said protrusions or depressions, instead of extending in the radial direction could also extend in an axial direction. Furthermore, the cams may become constantly higher or lower, thereby always merging within each other. And finally, in place of the program-wheels, curve templates may be substituted which would be returned once per month or once per year or once every 4 years (considering the leap years). In defining the principal thought of the invention, the notion of the drive mechanism being additionally activated when the just scanned day-program wheel cam exceeds a certain boundary value, also implies of course falling below a lower boundary. And finally, the month-program wheel may be driven by the day-program wheel or a drive element therefor directly or indirectly, i.e. by means of intermediate driving components.

In the preferred embodiment of the inventive device the day- and month-program wheels are arranged coaxially, and between them a spring forming a friction-clutch is provided. Here particularly the savings to be achieved through the invention become apparent, since in place of a step drive mechanism a simple coil- or leaf-spring may be substituted.

A particularly simple blocking of the month-program wheel during the course of a month, i.e. between the month change-overs, may be achieved by means of the following construction. Those cams of the month-program wheel rising in the radial direction are all the higher, the larger the number of days of the corresponding month, while the height of the cams of the day-program wheel extending also in the radial direction increases from the 29th to the 31st sector; further the scanner of the month-program wheel is liftable from the month-program wheel by the scanner of the day-program wheel when the height of the just scanned day-program wheel cam exceeds a certain boundary value determined by the simultaneously scanned month-program wheel cam. Thus it requires merely simple shoulders between the cams of the month-program wheel, such shoulders being all equally high and their height corresponding to the height of the most extreme, i.e. of the highest cam of the day-program wheel, for the scanner of the month-program wheel to lock such wheel by positioning itself between the shoulders until the most extreme cam of the day-program wheel by means of its scanner raises it and releases the month-program wheel. Thus it requires only the provision of the shoulders between the cams of the month-program wheel in order to effectuate the blocking mechanism, since the scanner of the month-program wheel acts simultaneously as the locking element. Of course, the shoulders of the month-program wheels must be higher than its highest cam in order to assure the blockage of the month-program wheel; the shoulders of the month-program wheels must, however, also be higher than the second largest cam of the day-program wheel, not to exceed the height of its highest cam, however, so that the month-program wheel on one hand is not released prematurely, while on the other hand it is released safely when the day-program wheel is advanced from its last to its first sector.

Registration cards or stamp cards are known which contain on each of their front and back sides 16 lines, whereby the second to the 16th lines correspond to the days of the first half of the month, while the first to 16th lines of the back side correspond to the 16th to the 31st day of the month; the uppermost or lowermost line of the front side therefore remains vacant. In order to assure that the second or second from the last line of the front side of the card is printed in time registration devices containing card receptors which are movable against the action of a return force and are returnable after each 16 movements, the day-program wheel in the preferred embodiment of the inventive device contains 32 sectors and cams of different height for the 29th to the 32nd sector. Therefore, the drive mechanism in every case runs beyond the month change by one advance step, so that the uppermost or lowermost line of the frontside of the card is skipped by the stamping process.

In order to make certain that the line is indeed skipped in those devices in which the uppermost line of one of the card sides is to remain unprinted, it is finally suggested to provide the registration card at its lower edge eccentrically with a cut-out, the depth of which corresponds to one line space, and further to install within the device a stop which reaches into the cut-out when the card receptor is located in its lowermost end position and a registration card is inserted into the device with a selected cardside turned toward the printing mechanism. In this manner it is assured that the stampcard can only be introduced into the lowermost position of the registration device when that cardside is turned toward the printing mechanism the uppermost line of which is to receive the stamp impression.

BRIEF DESCRIPTION OF THE DRAWINGS

Further characteristics, advantages, and details of the invention are presented in the attached claims and/or the description below of the attached diagrams of a preferred embodiment of the inventive time registration device. There is shown in:

DETAILED DESCRIPTION OF A PREFERRED EMBODIMENT OF THE INVENTION

Figure 1A:
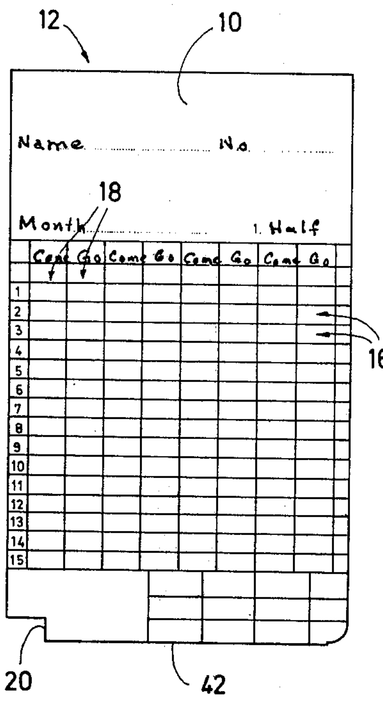
FIG. 1*a* and 1*b* front and back-side of a registration card suitable for the represented embodiment of the registration device.
Figure 1B:
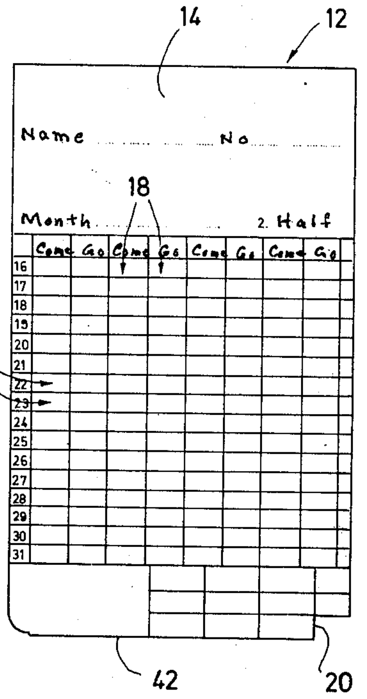
Figure 5:
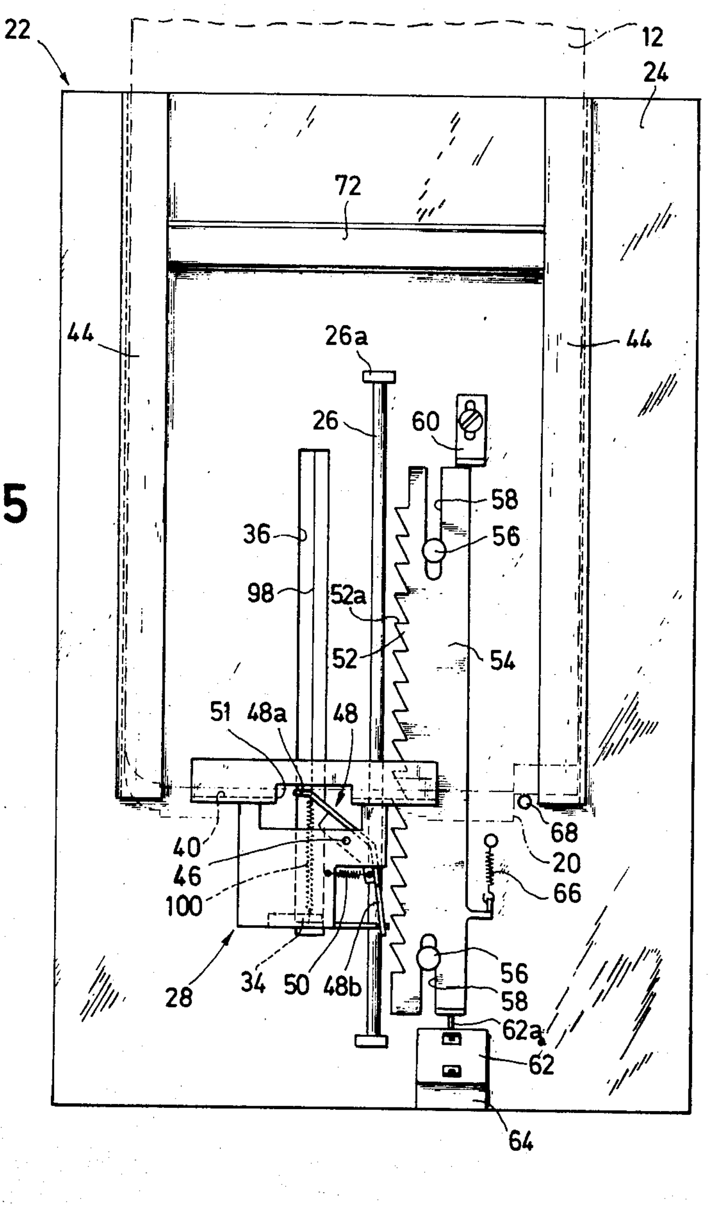

The frontside 10 of registration card 12 shown in FIG. 1*a* is designed for recording in the first half of a month and, as is also the case for the backside 14 for the second half of a month, is subdivided into lines 16 as well as columns 18. While the first line of front side 10 is to remain vacant, the second to 16th lines of the frontside are assigned to the first to 15th day of a month, while the first to 16th line of the backside of the cards are to be imprinted for the 16th to 31st day of a month. Columns 18 are assigned those times at which a certain employee for whom is provided a certain registration card, commences working in the morning, interrupts or resumes working at the beginning and end, respectively, of a morning break, the lunch break, and an afternoon break, and finally stops working in the late afternoon. Lastly the registration card according to the invention contains on the one side at its lower border a cut-out 20, which for the preferred embodiment is located in the left lowermost corner of the frontside 10 of the card. The purpose of such cut-out will become apparent in the course of the following description. The apparatus rear wall designated as a whole with 22 supports on its front side 24 a guide bar 26 on which a card stop means or receptor 28 is attached slidably in a vertical direction. For this purpose the card receptor or carriage possesses arms 30 and 32 having holes not represented in detail to accommodate guide bar 26; furthermore, another arm 34 of the card carriage extends through a long stretched window 36 of the device's rear wall, this arm also assuming a guide function in addition to preventing the rotation of the card carriage around guide bar 26. As may be particularly seen in FIGS. 2 and 5, the card receptor comprises a card support 38 with a base 40 onto which the lower edge 42 of the registration card inserted in the device lies. For improved guidance of the registration cards the device's rear wall 22 on its front side 24 is provided with two guide angles or rails 44. Within the card receptor at 46 a double armed lever 48 is hinged swingably, its one arm 48*a*, under the force of a pulling spring 50 attached to the other arm 48*b*, being pivoted into an opening 51 of the card support 38, so that the lever 48 is rotated counterclockwise around pivot 46 by a registration card inserted into the device to base 40 of the card support. Hereby the lever arm 48*b* reaches between the teeth 52 of a sawtooth bar 54, which is supported slidably in a vertical direction at the rear wall of the device by means of two pins 56 attached to the rear wall 22 as well as two slots 58. The teeth are of saw tooth shape and on the upper side contain a horizontal flank 52*a*. The tooth bar is positioned between an adjustable backstop 60 at the device's rear wall and the actuating pin 62*a* of a microswitch 62 which is supported at the rear wall of the device by angle 64. In order to prevent the microswitch from being actuated by the weight of saw tooth bar 54, a spring 66 which at its upper end is fastened to a pin in the rear wall of the device, pulls the saw tooth bar against the upper back stop 60.

An upper carrying bar 26*a* of the guide bar 26 limits the movement path of card receptor 28 toward the upside, while the lower back stop for the card receptor for simplicity sake has been omitted. To control the lower end position of the card there is, however, a backstop 68 supported by the rear wall of the device, such back-stop being positioned so that a registration card is located higher by one line spacing than the card receptor in its lowermost end position when it is inserted into the device with its frontside 10 turned toward the front. Then the back-step 68 does not reach into cut-out 20, and the card with its lowermost edge as a result is not pressed against the card receptor, and so micro-switch 62 cannot be activated. Had the card, however, been inserted with its backside 14 turned toward the front, it can be positioned with the lower card edge against the backing 40 of the card receptor because back stop 68 can reach into cut-out 20 of the card, which according to the invention is one line spacing deep.

Figure 2:
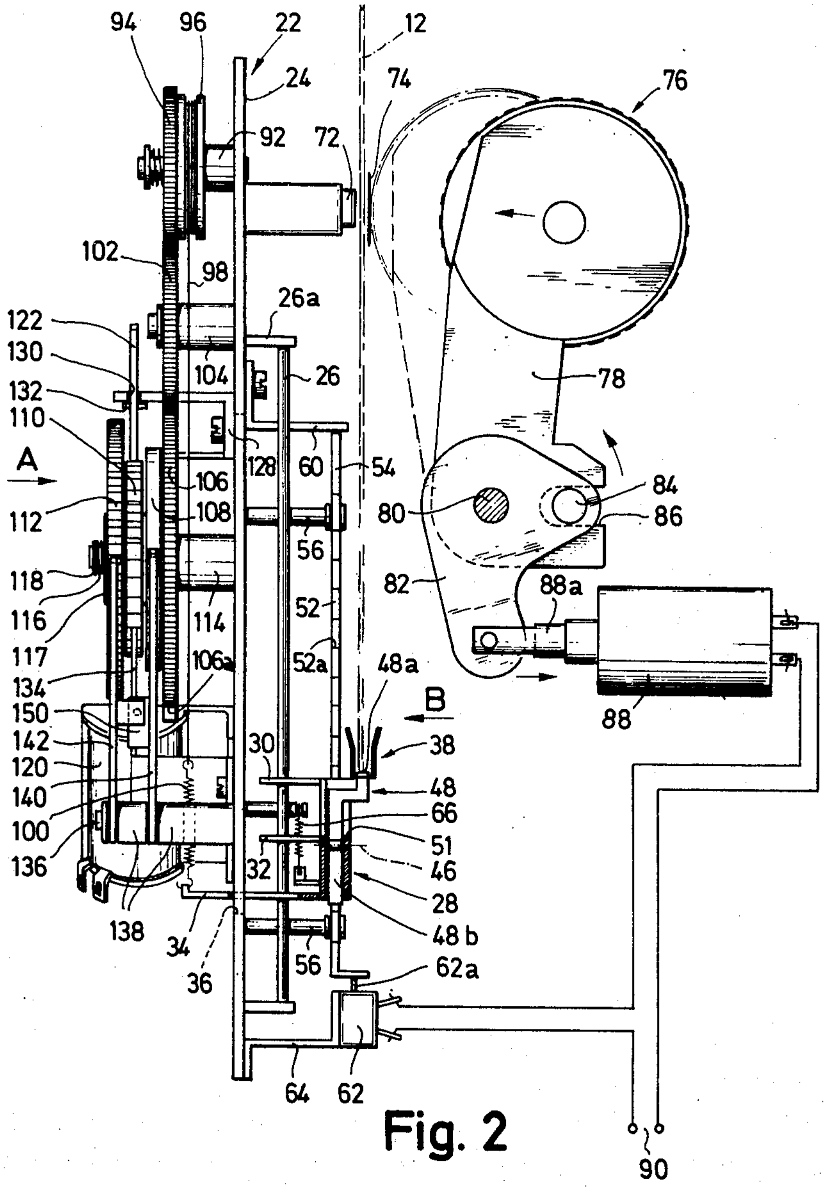
FIG. 2 a side view of the rear wall of the registration device containing the components important for the invention.

As may be seen in FIG. 2 the registration cards 12 are inserted into the device between a rubber strip 72, arranged in the direction of the lines on the cards and fastened to the rear wall 22 of the device, and a color ribbon 74 also arranged in direction of the lines. By such means a print-head 76 can imprint time of day onto the registration card. For these purposes the printing head is controlled in a usual and not represented manner by a clock, and is mounted on a support member 78 which may be pivoted around a rod 80. This rod is attached immovably between not represented side walls of the registration device. Therefore the printhead 76 may also be displaced in line direction, which occurs by means of a not represented program control mechanism. At the ends of rod 80 and rotatably thereon there are supported connecting plates 82; both such connecting plates are themselves interconnected by means of a rod 84. Such rod 84 extends into a cutout 86 of the support member 78 so that upon pivoting of the connecting plates 82 the printhead 76 is impacted against the ribbon 74 and the registration card 12 being then positioned within the instrument, and thus a time of day is printed out. For the execution of the printing process an electromagnet 88 is mounted in the area of one of the not represented side walls of the device; to said electromagnet's anchor 88*a*, retractible in the direction of the arrow, one of the connecting plates 82 is joined.

As may also be recognized from FIG. 2, the microswitch 62 actuates the electromagnet 88 since it is connected to a voltage source 90 through the microswitch.

Figure 3:
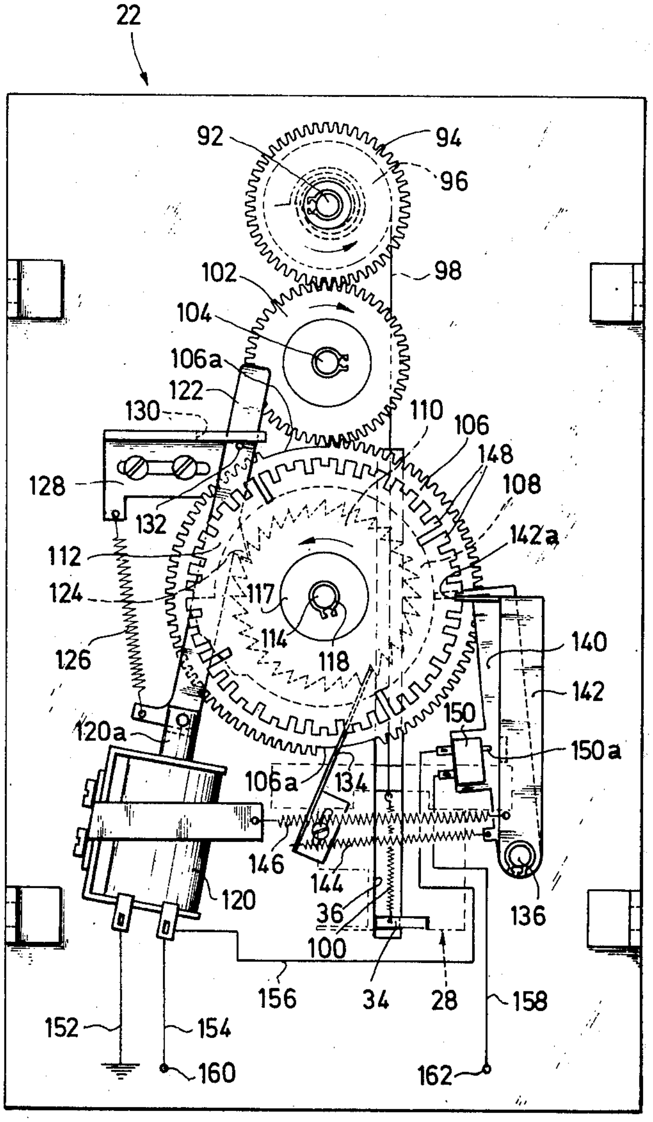
FIG. 3 a view of said rear wall from the back side, i.e. according to arrow A of FIG. 2.
Figure 4:
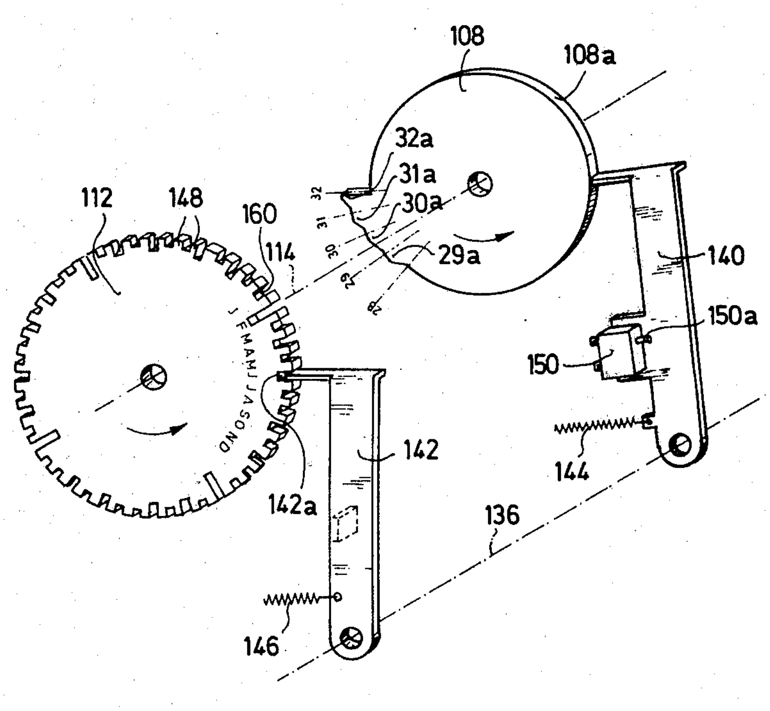
FIG. 4 a representation of the day- and the month-program wheels from FIG. 3, including scanning levers in a perspective and expanded view and FIG. 5 a view of the rear wall of the device from the front, i.e. according to arrow B of FIG. 2.

By means of FIGS. 2–4 the drive mechanisms for card receptor 28 will now be explained. Onto a first axis 92 fastened to the rear wall of the device, a gear 94 and a sheave 96 are rotatably supported; both of these components are firmly connected with each other. A string 98 is wound in a clockwise direction onto the sheave (see FIG. 3), the free end of which string is connected via a spring 100 to arm 34 of the card receptor. Gear 94 meshes with a second gear 102 which is also supported by an axis 104 attached to the rear wall of the device, and which in turn engages a gear 106 which is rotatably supported on a third axis 114 together with a day-program wheel 108, a ratchet 110, and a month-program wheel 112. Gear 106, day-program wheel 108, and ratchet 110 are firmly connected with each other by not represented means, while the month-program wheel is forced toward the ratchet 110 by a spring 116 mounted on the axis 114; washer 117 as well as ring 118 attached to axis 114 serve to secure aforesaid spring 116. As revealed in FIG. 3, gear 106 contains two toothless sections 106*a*, which are positioned diametrically opposite each other.

To advance the drive mechanism there is attached to rear wall 22 of the device an electromagnet 120 to which retractable anchor 120 an actuating or switch lever 122 is connected. Same carries a ratchet tooth 124 which cooperates with the ratchet 110 and is maintained in engagement by means of a pulling spring 126. Said spring is attached on one side to one arm of the double armed switch lever 122 and on the other side to a guide angle 128, which is attached adjustably to the rear wall of the device, and which contains a slot 130 through which the other arm of switch lever 122 extends. This arm carries a back-stop 132, which limits the return movement of the switch lever 122 caused by pull spring 126. Finally, a leaf spring 134 reaches between the teeth of ratchet 110, said spring being also fastened to the rear wall of the device in order to prevent the reverse rotation of the ratchet when the switch lever 122 executes its reverse movement. The device rear wall further supports another axis 136, onto which two follower or scanning levers 140 and 142 are mounted spaced apart with bushings 138. Said levers are pulled against the circumference of the day-program wheel 108 or the month-program wheel 112 by pull springs 144 and 146, and it is important that the scanning lever 142 assigned to the month-program wheel contains a scanning edge 142*a* capable of reaching between cams 148 of the month-program wheel. One of the two scanning levers (in the represented embodiment the scanning lever 140) carries a microswitch 150 with its switch actuating pin 150*a* turned toward the other scanning lever, so that the microswitch will be closed when both scanning levers while moving together have reached a certain position relative to each other. The coil of the electro-magnet 120 is on one side grounded by means of conductor 152, and on the other side is connected via conducters 154, 156 and 158 to a day impulse source 160 as well as a further impulse source 162. By means of the not represented but well known program control the day impulse source 160 is providing a pulse once daily, for example at midnight, so that the electro-magnet 120 attracts. At the impulse source 162, however, impulses provided by the program control occur in rapid succession, for example in second or minute intervals, so that when micro-switch 150 positioned between the connectors 156 and 158 is closed, the electro-magnet 120 advances ratchet 110 rapidly.

Ratchet 110 has 32 teeth, i.e. the number of its teeth is equal to the number of lines on front- and back-sides of the registration cards. The design of the day-program wheel 108 is revealed in FIG. 4. One may conceptually subdivide this day-program wheel, which of course turns together with ratchet 110, into 32 sectors from which the first to the 31st correspond to the days of the month; the 32nd corresponds to an idle step. The first to 28th sector form a circular circumference 108*a*, while the 29th to 32nd sectors are represented by cams 29*a* to 32*a* increasing in height; cam 32*a*, however, is narrower than the other cams.

For the preferred embodiment of a registration device according to the invention, the month-program wheel 112 contains the program for a full cycle between two leap years, whereby for each month there is a recess or cut 160 between two cams 148. The depth of these cuts has a reverse relationship to the length of the month, i.e. the cut is deeper the fewer days there are in the corresponding month. In FIG. 4 the months corresponding to a quarter of the cuts are indicated by their first letters; one can see particularly clearly that the month February with normally 28 days has a particulary deep cut. The radius of the circular circumference 108*a* of the day-program wheel 108, the height of its cams 29*a*–32*a*, the height of the cams 148, and the depth of the cut 160 of the month-program wheel 112, as well as the dimensions of the scanning levers 140 and 142 and the positioning of the micro-switch 150 are designed and arranged so that the micro-switch 150 will be closed when scanning lever 140 rides over certain cams of the day-program wheel. Thus the switch will be closed when the scanning lever encounters the cam standing for the sector having the numeral (i.e. one of the numbers of 1 to 32) corresponding to the number of days within the month currently being scanned by scanning lever 142 at month program wheel 112. For example, when during the forward switching process in the night of January 31st – February 1st of a year, the scanning lever 140 rides over cam 31*A* of day program wheel 108, micro-switch 150 is closed by scanning lever 142, said lever having just scanned cut 160 of the month-program wheel corresponding to the month of January. The fewer number of days are contained in the just terminating month, the earlier micro-switch 150 closes.

The manner of operation of the represented and described registration device 15 is as follows. Gear 106 is adjusted relative to the day-program wheel 108 such that sections 106*a* are always positioned opposite gear 102 when scanning lever 140 is just scanning the 16th or 32nd sector of the day-program wheel. Then the drive connection between gears 102 and 106 is disengaged, so that card receptor 28 can fall back into its lower end position under its own weight. In this position the uppermost line of the registration card would always be printed were not card back stop 68 provided so that in the lowermost end position of card receptor 28 only the uppermost line of card backside 14, i.e. the line corresponding to the 16th day of a month, can be printed; when, however, inserting a registration card with the card frontside turned toward the printhead 76, the second uppermost line on the card frontside would be positioned opposite the print head, so that the uppermost line of the front-side of the card would assuredly remain unprinted. Daily, particularly around midnight, the card receptor is raised by one line space by means of the electromagnet 120 turning the ratchet 110 by one gear, the tooth distances of the ratchet, after adjusting for the translational relationship between the gears 94, 102, and 106 as well as the diameter of sheave 96, corresponding approximately to one line space on the registration card.

The printing process is executed as follows. Before the lower edge of a registration card inserted into the device comes to rest at the base 40 of card support 38 it touches arm 48*a* of lever 48, so that upon further insertion of the registration card into the device this lever is pivoted in a counterclockwise motion (see FIG. 5). Thereby the right arm 48*b* of this lever reaches within the teeth 52 of saw tooth bar 54; the distance between the horizontal flanks 52*a* of these teeth are equal to the line distances on the registration cards. If one forces the registration card yet a small amount further into the device, the card receptor by means of lever 48 takes down with it the saw tooth bar 54, so that micro-switch 62 is activated and the electric circuit to electromagnet 88 is closed.

At the end of the 15th day of each month one of the teethless sections 106*a* of gear 106 reaches the position opposite gear 102, so that the card receptor falls back down into its initial position. During the next switching step of ratchet 110, however, the teeth of gear 106 again reach into the gearing of gear 102, so that a switching occurs from the line of the backside of the card corresponding to the 16th day of the month to the next uppermost line.

Let it now be assumed that the month just scanned contained only 30 day. Then the scanning lever 140 at the end of this 30th day rides across cam 30*a* of the 30th sector of day program wheel 108, whereby because of the position of scanning lever 142 corresponding to the number of days of this month micro-switch 150 is closed and ratchet 110, day-program wheel 108, and gear 106 are advanced in rapid succession by impulse source 162. If the advance is from the 31st to the 32nd sector of day-program wheel 108, one of the toothless sections 106*a* of gear 106 would be located opposite gear 102, so that the card receptor returns back to its lower initial position. Upon switching forward of the day-program wheel from the 32nd to the 1st sector, i.e. from cam 32*a* to the circular circumference 108*a*, a switching from the uppermost line of the front side 10 of the card to the second to the uppermost line occurs, so that now the line of the front side of the card corresponding to the first day of the new month is located opposite print head 76; of course, upon forward switching from the 32nd to the 1st sector of the day program wheel 108, gears 102 and 106 are again engaged. Since cam 32*a* is narrower than one switch step of the day-program wheel, it is assured that micro-switch 150 is open at the end of this switch step. When the scanning lever 140 returns from cam 32*a* back to the circular circumference 108*a* of the day program wheel, microswitch 150 is at the same time opened, so that ratchet, day-program wheel, and gear 106 henceforth can only be further advanced in day intervals.

The invention provides no separate drive for month-program wheel 112; rather it is carried along or rotated through friction by the wheels on axis 114 advanced by electromagnet 120, when such carrying along is not prevented by the extension of scanning lever 142 between cams 148 of the month program wheel. Cams 148 are so high that scanning lever 142 releases them when scanning lever 140 rides onto the highest cam 32*a* of the day-program wheel 108, and by means of a stop, for example micro-switch 150, thereby carries scanning lever 142 along, i.e. rotates it according to FIGS. 3 and 4 in a clockwise direction. When then the day-program wheel is switched forward from its 32nd to its first sector, the month-program wheel 112 it taken along, whereby it does not matter that the distance between the cuts 160 of the month-program wheel corresponds to the switch steps of ratchet and day-program wheel; the distance of cuts 160 may as well be greater, since it suffices that upon return of the scanning lever 140 to circular circumference 108*a* of the day-program wheel the scanning lever 142 abuts against cam 148 located between monthly cuts 160. Then the month-program wheel 112 is not arrested and will be carried forward with the next switching step of the drive mechanism, whereby then scanning lever 142 will lock into the next cut 160.

From the above description it may incidentally be seen that the 32nd sector, or cam 32*a* of day-program wheel 108, is responsible for the skipping of the uppermost line of the front side 10 of the card, and not the stop 68, which is designed merely to indicate to a user when he or she has inserted the registration card into the device with the wrong side turned forward.

Finally, the above description reveals that cut-out 20 at the lower card edge and stop 68 prevent a printing of the registration card if it accidentally has been inserted into the registration device on the first day of a month with its front side 10 turned toward print head 76.

We claim:

1. In a time registration device for the recordation of presence or work time by means of a time controlled printing device onto a line of a registration card corresponding to a particular day, such time-registration device having

- a card receptor, forming a backstop for the registration card inserted into the device in a direction perpendicular to its lines, being movable in said direction, and being advanceable daily by a drive mechanism, by at least one line;
- a day-program wheel, advanceable daily by the drive mechanism, and containing at least 31 sectors, one for each day of a month, of which the 29th to 31st sectors have cams of differing heights;
- a month-program wheel, being advanceable monthly and containing at least 12 sectors, one for each month, each sector forming a cam which height corresponds to the number of days within the month represented by the cam; and
- scanners for the day- and month-program wheels, such scanners, together with a switch actuated therewith, forming a comparator for the additional activation of the drive mechanism in the case when the just scanned day-program wheel cam exceeds a boundary value set by the simultaneously scanned month-program wheel cam;

the improvement comprising the month-program wheel being driven together with the day-program wheel by means of friction, and providing a locking mechanism for the month-program wheel, such mechanism being controllable by the most extreme cam of the day-program wheel.

2. Time-registration device as in claim 1, in which the day- and month-program wheels are arranged coaxially, and in which there is provided a spring acting upon both wheels, the wheels and the spring thereby forming a friction clutch.

3. Time-registration device as in claim 1, and in which one of the scanner supports the switch which is actuated by the other scanner.

4. Time-registration device as in claim 1, in which the registration cards at their lower edge comprise eccentrically a cut-out, the depth of which corresponds to one line-space, and in which the time registration device possesses a backstop which reaches into the cut-out when the card receptor is located in its lower end position and a registration card has been introduced into the time registration device with its backside turned toward the print mechanism.

5. In a time-registration device as in claim 1, having a program control for the initiation of day-impulses as well as impulses of higher pulse frequency, the drive mechanism by means of a switch being connectable to impulses of higher pulse frequency.

6. In a time-registration device as in claim 1, the card receptor of which is advanceable against the action of a return force and is returnable after each 16 advance steps, the day-program wheel containing 32 sectors, the cams for the 29th to the 32nd sector being of different heights.

7. Time-registration device as in claim 6, in which the 32nd cam is narrower than the other cams, i.e. narrower than an advance step of the day-program wheel.

8. Time-registration device as in claim 1, and in which the cams of the month-program wheel preferably rising in a radial direction are the higher, the greater the number of days of the corresponding month is; in which the height of the cams of the day-program wheel, which preferably also rise in a radial direction, increases from the 29th to the 31st sector of said day-program wheel; and in which the scanner of the month-program wheel when the height of the just scanned day-program wheel cam exceeds a boundary value set by the simultaneously scanned month-program wheel cam.

9. Time-registration device as in claim 8, and in which the month-program wheel contains shoulders between its cams, the shoulders all being equally high, their heights corresponding to that of the most extreme cam of the day-program wheel, so that the scanner of the month-program wheel locks said month-program wheel until it is raised by the most extreme cam of the day-program wheel by means of its scanner, thus releasing the month-program wheel.

10. Time-registration device as in claim 8, in which the scanners are levers, and in which said switch is closed when the height of the scanned day-program wheel cam is equal to or larger than that of the scanned month-program wheel cam.

* * * * *